(12) United States Patent
Iwami

(10) Patent No.: US 6,713,007 B2
(45) Date of Patent: Mar. 30, 2004

(54) METHOD OF MAKING A GOLF BALL

(75) Inventor: Satoshi Iwami, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 294 days.

(21) Appl. No.: 09/993,700

(22) Filed: Nov. 27, 2001

(65) Prior Publication Data

US 2002/0117778 A1 Aug. 29, 2002

(30) Foreign Application Priority Data

Nov. 27, 2000 (JP) ........................................ 2000-359225

(51) Int. Cl.$^7$ ........................... B29C 39/12; B29C 43/18
(52) U.S. Cl. ..................... 264/254; 264/275; 264/279.1
(58) Field of Search ................................ 264/254, 248, 264/279.1, 275

(56) References Cited

U.S. PATENT DOCUMENTS

| | | | | |
|---|---|---|---|---|
| 1,883,704 A | * | 10/1932 | Goodwin | 156/213 |
| 1,930,167 A | * | 10/1933 | Goodwin | 264/153 |
| 2,940,128 A | * | 6/1960 | Bowerman et al. | 264/254 |
| 3,989,568 A | | 11/1976 | Isaac | |
| 4,410,387 A | * | 10/1983 | Halkerston et al. | 156/245 |
| 5,006,297 A | | 4/1991 | Brown et al. | |
| 5,334,673 A | * | 8/1994 | Wu | 473/378 |
| 5,733,428 A | * | 3/1998 | Calabria et al. | 264/134 |
| 5,888,437 A | * | 3/1999 | Calabria et al. | 264/135 |

FOREIGN PATENT DOCUMENTS

| | | |
|---|---|---|
| EP | 0 664 206 A1 | 7/1995 |
| JP | 8-47553 | 2/1996 |

* cited by examiner

*Primary Examiner*—Edmund H. Lee
(74) *Attorney, Agent, or Firm*—Birch, Stewart, Kolasch & Birch, LLP

(57) ABSTRACT

The present invention provides a method of making a golf ball comprising a core and polyurethane cover. The present invention relates to a method of making a golf ball comprising the steps of: (a) forming a core, and (b) putting polyurethane cover composition into a first half mold and allowing the composition to be made to a given gel state; turning the first mold upside down so as to position it above a core half mold placing the core therein; clamping the molds and press molding to form an intermediate molded article of golf ball; putting the composition into a second half mold and allowing the composition to be made to a given gel state in the same manner as the step (i); positioning the second mold below the first mold; clamping the molds and press molding to cover the other half of the surface of the core with the polyurethane cover.

5 Claims, 3 Drawing Sheets

(i)

(iii)

(ii)

(iv)

(i)

(iii)

(ii)

(iv)

METHOD OF MAKING A GOLF BALL

FIELD OF THE INVENTION

The present invention relates to a method of making a golf ball. More particularly, it relates to a method of making a golf ball comprising a step of covering polyurethane cover on the surface of a core.

BACKGROUND OF THE INVENTION

Recently, ionomer resin has been widely used as a cover of golf ball, because the ionomer resin has superior in rebound characteristics, durability, processability and the like. However, since the ionomer resin has high stiffness and hardness, It is inferior in shot feel and controllability when compared with balata (trans-polyisoprene), which is a conventional cover material for thread wound golf balls.

Polyurethane has been also conventionally used as another cover material for golf balls. The golf balls using the polyurethane cover have high resilience when compared with golf balls using the ionomer cover, and have shot feel and controllability as good as golf balls using the balata cover. However, since there has been problem that it is difficult to control a reaction of the polyurethane unlike the ionomer resin, there has been various suggestions of a method of making a golf ball using the polyurethane cover, particularly a method of covering the polyurethane cover (Japanese Patent Kokai Publication Nos. 74726/1976, 261478/1990, 47553/1996 and the like).

In Japanese Patent Kokai Publication No. 74726/1976, a method comprising the steps of forming two half shell blanks of polyurethane, covering the half shell blank on a core to form polyurethane cover by half, and covering the other on the core to complete polyurethane cover is described. In Japanese Patent Kokai Publication No. 261478/1990, a method comprising the steps of forming polyurethane cover having a smooth surface, and then forming dimples on the cover by compression molding is described. However, there was problem that the reaction of the polyurethane was not uniform in the both methods, because the reaction is not sufficiently controlled.

In Japanese Patent Kokai Publication No. 47553/1996, a method comprising the steps of placing polyurethane in a selected state of gel in a first mold; covering a half of the surface of the core, of which the surface is coated with latex, with the polyurethane cover in the first mold positioned below the core; placing polyurethane in a selected state of gel in a second mold as described above; and covering the other half of the surface with the polyurethane cover is described. In the method, the surface of the core is coated with latex by dipping the core in latex in order to avoid of permitting air to pass through it into the interstices in the windings of the wound core or allowing the rubber strands to unravel. There is problem to degrade rebound characteristics and spin amount, because the latex layer is a cushion layer between the core and cover and it is difficult to penetrate the cover into the core by the presence of the latex layer.

OBJECTS OF THE INVENTION

A main object of the present invention is to provide a method of making a golf ball having excellent initial velocity and excellent spin performance by accomplishing uniformly thickness of the cover, and the effectively transmission of applied force thereon at the time of hitting because of preventing the thread rubber from unraveling, and penetrating the cover material into the interstices of the windings of a thread rubber in case of using the thread wound core.

According to the present invention, the object described above has been accomplished by using a method of making a golf ball comprising the steps of:

putting polyurethane composition for the cover into a preheated first half mold, followed by allowing said polyurethane composition to be made to a given gel state, placing the core on a core half mold having a semi-spherical cavity with a diameter enough for holding the core therein, and turning the first half mold upside down so as to position it above the core half mold, clamping the first half mold and the core half mold to press mold with heating, forming an intermediate molded article of golf ball, which a half of the surface of the core is covered with the polyurethane cover, putting polyurethane composition for the cover into a preheated second half mold, and allowing said polyurethane composition to be made to a given gel state in the same manner as the first half mold, followed by positioning the second half mold below the first half mold with keeping the intermediate molded article in the first half mold, clamping the first half mold and the second half mold to press mold with heating, and covering the other half of the surface of the core with the polyurethane cover, thereby providing a method of making a golf ball having excellent initial velocity and excellent spin performance by accomplishing uniformly thickness of the cover, and the effectively transmission of applied force thereon at the time of hitting because of preventing the thread rubber from unraveling and penetrating the cover material into the interstices of the windings of a thread wound core in case of using the thread wound core.

This object as well as other objects and advantages of the present invention will become apparent to those skilled in the art from the following description with reference to the accompanying drawings.

BRIEF EXPLANATION OF DRAWINGS

The present invention will become more fully understood from the detailed description given hereinbelow and the accompanying drawings which are given by way of illustration only, and thus are not limitative of the present invention, and wherein.

SUMMARY OF THE INVENTION

The present invention provides a method of making a golf ball comprising a core and polyurethane cover covering the core, the method comprising the steps of:

(a) forming a spherical core, and (b) (i) putting polyurethane composition for the cover into a preheated first half mold having a semi-spherical cavity, followed by allowing said polyurethane composition to be made to a given gel state, wherein the cavity has such a diameter as provides the golf ball having a desired diameter, and many projections are provided in the cavity to form dimples on a surface of the golf ball, (ii) placing the core on a core half mold having a semi-spherical cavity with a diameter enough for holding the core therein, and turning the first half mold upside down so as to position it above the core half mold, (iii) taking down the first half mold, and clamping the first half mold and the core half mold to press mold with heating, (iv) opening the mold by raising the first half mold to form an intermediate molded article of golf ball, wherein a half of the surface of the core is covered with the polyurethane cover, (v) putting polyurethane composition for the into a preheated second half mold having a semi-spherical cavity and allowing the polyurethane composition to be made to a given gel state in the same manner as the step (i), followed by positioning the second half mold below the first half mold with keeping the intermediate molded article in the first half mold, (vi) taking down the first half mold, clamping the first half mold and the second half mold and press molding with heating to cover the other half of the surface of the core with the polyurethane cover, and (vii) after cooling, opening the mold by raising the first half mold to take out a molded article.

In order to put the present invention into a more suitable practical application, it is desired that the core be thread wound core;

it is desired that the polyurethane cover be formed from polyurethane composition for the cover comprising urethane prepolymer having terminal isocyanate group and aromatic polyamine-based curing agent;

it is desired that the curing agent be 2,2'-dichloro-3,3',5,5'-tetraethyl-4,4'-diaminodiphenylmethane; and the cover has a thickness of 0.5 to 2.0 mm.

DETAILED DESCRIPTION OF THE INVENTION

Figure 1:
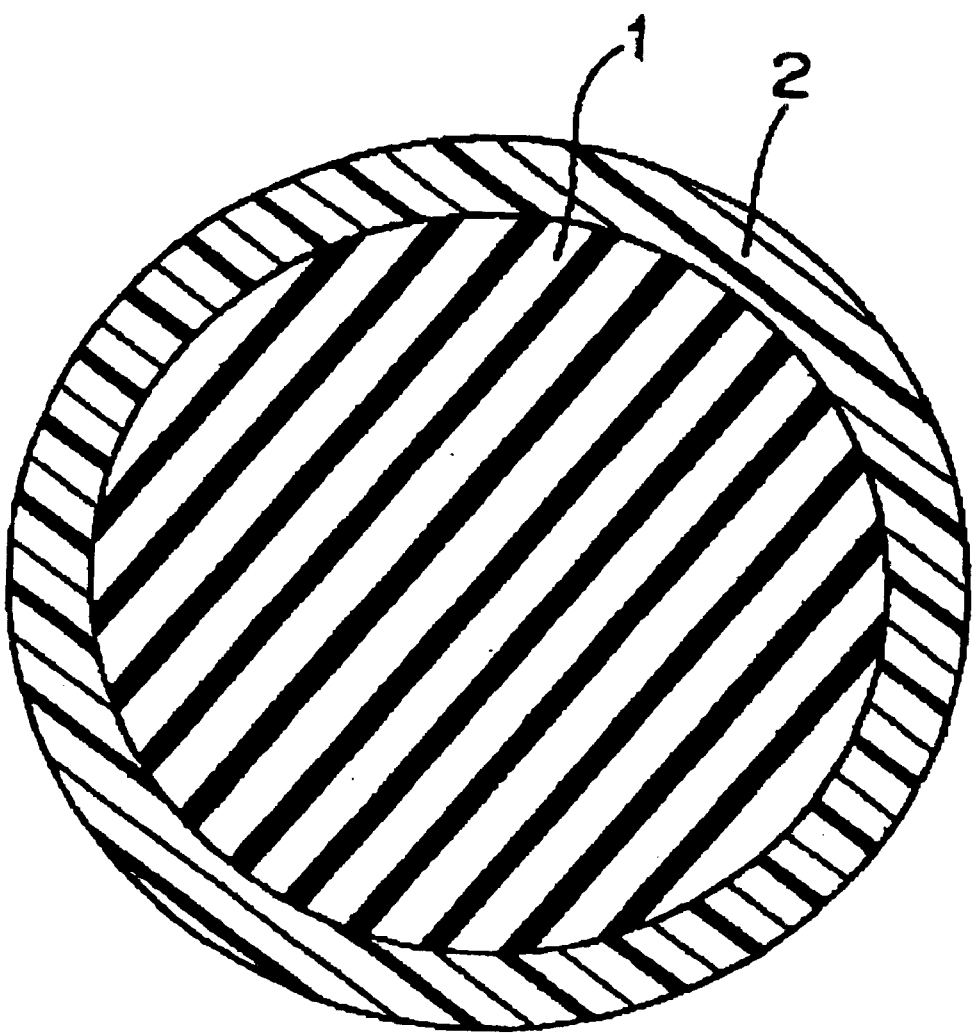
FIG. 1 is a schematic cross section illustrating one embodiment of the golf ball of the present invention.

The golf ball of the present invention will be explained with reference to the accompanying drawings. FIG. 1 is a schematic cross section illustrating one embodiment of the golf ball of the present invention. As shown in FIG. 1, the golf ball of the present invention consists of a core 1 and polyurethane cover 2 covering the core. The golf ball of the present invention may be either thread wound golf balls or solid golf balls, such as a two-piece golf ball.

The core for thread wound golf ball (thread wound core), which may be the same one that has been conventionally used, comprises a center and a thread rubber layer formed by winding thread rubber in a stretched state around the center, wherein the center may be either liquid center or solid center formed from rubber composition. The thread rubber can be of the same kind, which has been conventionally used for the thread rubber layer of the thread wound golf ball. For example, the thread rubber can be obtained by vulcanizing a rubber composition prepared by formulating sulfur, a vulcanization aid, a vulcanization accelerator, an antioxidant and the like to a natural rubber or a blend rubber of the natural rubber and a synthetic polyisoprene. A thread-wound core can be produced by drawing the thread rubber about 1000% and winding it over the center.

The core used for solid golf ball (solid core) may be also the same one that has been conventionally used, and may be obtained by uniformly mixing a rubber composition using a proper mixer such as a mixing roll, and then vulcanizing and press-molding under applied heat the rubber composition in a mold into a spherical form. The rubber composition comprises 10 to 60 parts by weight of a vulcanizing agent (crosslinking agent), for example, $\alpha,\beta$-unsaturated carboxylic acid (such as acrylic acid, methacrylic acid, etc.) or mono or divalent metal salts, such as zinc or magnesium salts thereof, or a functional monomer such as trimethylolpropane trimethacrylate, or a combination thereof;

0.5 to 5 parts by weight of co-crosslinking initiator such as organic peroxides;

10 to 30 parts by weight of filler such as zinc oxide, barium sulfate; and optionally antioxidant and the like;

based on 100 parts by weight of a base rubber such as polybutadiene rubber. The vulcanization may be conducted, for example, by press molding in a mold at 130 to 240° C. and 2.9 to 11.8 MPa for 15 to 60 minutes. It is preferable for the surface of the resulting core 1 to be buffed to improve the adhesion to the cover 2 formed on the core. The solid core may have single-layered structure or multi-layered structure which has two or more layers. However, such solid and thread-wound cores are given by way of illustrative examples only, and the invention shall not be limited thereto.

In the golf ball of the present invention, it is desired for the core 1 to have a diameter of 38.8 to 41.8 mm, preferably 39.6 to 40.8 mm. When the diameter of the core is smaller than 38.8 mm, the thickness of the thread rubber layer is thin, and the rebound characteristics are degraded. On the other hand, when the diameter of the core is larger than 41.8 mm, the thickness of the cover is thin, and it is difficult to mold it. In addition, the technical effect accomplished by the presence of the cover is not sufficiently obtained.

In the golf ball of the present invention, it is desired for the polyurethane cover 2 to be formed from polyurethane composition for the cover comprising urethane prepolymer having terminal isocyanate group and curing agent. The polyurethane composition for the cover comprising urethane prepolymer having terminal isocyanate group used in the present invention is not limited as long as it has at least two isocyanate groups in molecular chain of the urethane prepolymer. The position of the isocyanate group in the molecular chain of the urethane prepolymer is not also limited, but it may be a terminal group in main chain or side chain of the urethane prepolymer. The urethane prepolymer having terminal isocyanate group is obtained by reacting isocyanate group of polyisocyanate compound with hydroxyl group of polyol in a molar ratio such that the isocyanate group is excess.

Examples of the polyisocyanate compounds are not limited, but include aromatic diisocyanates, such as 2,4-tolylene diisocyanate, 2,6-tolylene diisocyanate or a mixture thereof (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), p-phenylene diisocyanate (PPDI) and the like; cycloaliphatic or aliphatic diisocyanates, such as hexamethylene diisocyanate (HDI), 4,4'-dicyclohexylmethane diisocyanate (hydrogenated MDI), isophorone diisocyanate (IPDI) and the like. The polyisocyanate compound may be used alone or in combination with two or more. Preferred is polyisocyanate compound containing TDI or hydrogenated MDI, or the compound containing it as a main component, because it imparts good mechanical properties to the resulting polyurethane cover and it imparts high rebound characteristics, good weather resistance and good water resistance to the resulting golf ball. In the present invention, TDI-based urethane prepolymer or the mixture with hydrogenated MDI-based urethane prepolymer can be suitably used. The TDI-based urethane prepolymer and hydrogenated MDI-based urethane prepolymer as used herein refer to polyisocyanate compound containing the TDI or the compound containing the TDI as a main component, and polyisocyanate compound containing the hydrogenated MDI or the compound containing the hydrogenated MDI as a main component, respectively.

Examples of the polyols are not limited as long as they have at least two hydroxyl groups, but may include low molecular weight polyol or high molecular weight polyol. Examples of the low molecular weight polyols include, for example, diols, such as ethylene glycol, diethylene glycol, triethylene glycol, 1,3-butanediol, 1,4-butanediol, neopentyl glycol, 1,6-hexanediol; triols, such as glycerin, trimethylolpropane, hexanetriol; and the like. Examples of the high molecular weight polyol include polyether polyols obtained by reacting alkylene oxide with a initiator having activated hydrogen; condensed polyether polyols obtained by hydration condensation of dibasic acid such as adipic acid and glycol or triol; lactone-based polyester polyols, such as ε-caprolactam, obtained by ring opening polymerization of lactams; polycarbonatediols synthesized by using cyclic diols; polymer polyols obtained by appropriately introducing hydroxyl group into acrylic copolymer, such as acrylic polyol; and the like.

Examples of polyether polyols include polyoxyethylene glycol, polyoxypropylene glycol (PPG), polyoxytetramethylene glycol (PTMG) and the like. Examples of the condensed polyester polyols include polyethylene adipate (PEA), polybutylene adipate (PBA), polyhexamethylene adipate (PHMA) and the like. Examples of the lactone-based polyester polyols include poly-ε-caprolactone (PCL) and the like. In view of rebound characteristics and water resistance, preferred is the polyether polyol, more preferred is the polyoxytetramethylene glycol.

Examples of combinations of the polyisocyanate and polyol preferably include a combination of polyisocyanate compound containing TDI, hydrogenated TDI or the mixture thereof as a main component and polyoxytetramethylene glycol. Concrete examples of the urethane prepolymer having terminal isocyanate group include urethane prepolymers commercially available from Uniroyal Chemical Co. under the trade name of "Adiprene" (such as "Adiprene LF900A", "Adiprene LF930A", "Adiprene LF950A", "Adiprene LF0330A", "Adiprene L200" and the like).

Examples of the curing agents used in the present invention include glycol-based or amine-based curing agent. Examples of the glycol-based curing agents include 1,4-butanediol, 1,3-butanediol, 2,3-butanediol, 2,3-dimethyl-2,3-butanediol, dipropylene glycol, ethylene glycol, and mixtures thereof.

Examples of the amine-based curing agents include diphenylmethanes, such as 3,3'-dichloro-4,4'-diaminodiphenylmethane (MOCA), 2,2'-dichloro-3,3',5,5'-tetraethyl-4,4'-diaminodiphenylmethane and the like; toluene diamines, such as 3,5-dimethylthio-2,4-toluene diamine, 3,5-diethyl-2,4-toluene diamine; benzoates, such as trimethylene glycol-di-p-aminobenzoate, polytetramethylene glycol-di-p-aminobenzoate; and the like. In the present invention, preferred are diphenylmethanes and benzoates, and more preferred are 2,2'-dichloro-3,3',5,5'-tetraethyl-4,4'-diaminodiphenylmethane and polytetramethylene glycol-di-p-aminobenzoate. The amount of the curing agent is not limited, but the curing agent is preferably used such that a molar ratio ($NH_2/NCO$) of $NH_2$ to NCO is within the range of 0.85 to 1.15, based on the urethane prepolymer having terminal isocyanate group. Concrete examples of the curing agents include amine-based curing agent commercially available from Uniroyal Chemical Co. under the trade name of "Ronzacure M-CDEA", amine-based curing agent commercially available from Air Products and Chemicals, Inc. under the trade name of "Polamine 250P" and the like.

In the polyurethane composition for the cover used in the present invention, catalysts that have been conventionally used in the reaction of the polyurethane can be contained. Examples of the catalysts include tertiary amine-based catalyst, organometallic catalyst and the like. Examples of the tertiary amine-based catalysts include triethylamine, triethylenediamine, N,N,N',N",N"-pentamethyldiethylenetriamine, N,N-dimethylethanolamine, ethylmorpholine and the like. In addition, blend of tertiary amine; and ethylene glycol, dipropylene glycol, 1,4-butanediol, N,N-dimethylethanolamine may be used. Examples of the organometallic catalysts include tin-based catalysts, such as dibutyltin dilaurate, dibutyltin diacetate, and the like. In the present invention, preferred is the blend of triethylenediamine and dipropylene glycol. Concrete example thereof includes catalyst commercially available from Air Products and Chemicals, Inc. under the trade name of "DABCO 33-LV".

The cover composition of polyurethane used in the present invention may optionally contain fillers, such as barium sulfate, etc.; pigments, such as titanium dioxide, etc.; and the other additives such as a dispersant, an antioxidant, a UV absorber, a photostabilizer and a fluorescent agent or a fluorescent brightener, etc., in addition to the urethane prepolymer having terminal isocyanate group and the curing agent, as long as the addition of the additives does not deteriorate the desired performance of the golf ball cover. An amount of the pigment is preferably from 0.1 to 5.0 parts by weight, based on 100 parts by weight of the cover resin component.

The method of making the golf ball of the present invention will be explained in detail. The method of making the golf ball of the present invention is roughly consisted of two steps of (a) forming the core 1, and
(b) covering the cover 2 on the core 1.

Figure 2:
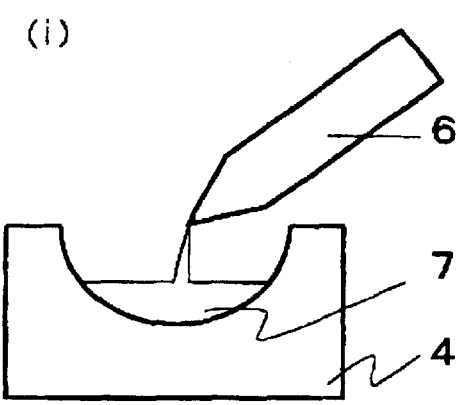
FIG. 2 is a schematic illustrating one embodiment of a method of making the golf ball of the present invention.
Figure 2:
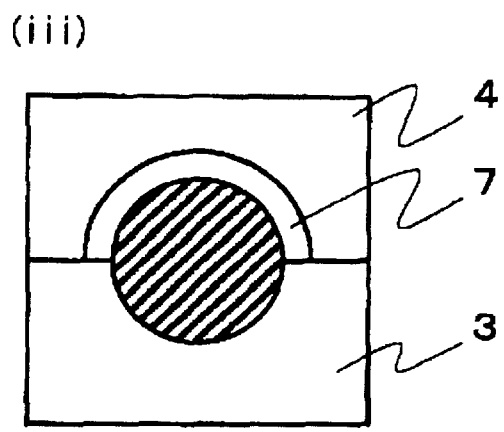
Figure 2:
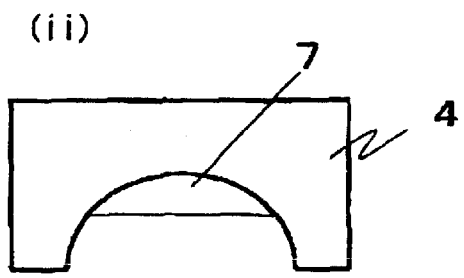
Figure 2:
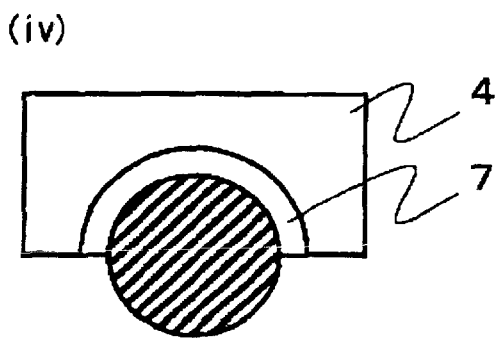
Figure 2:
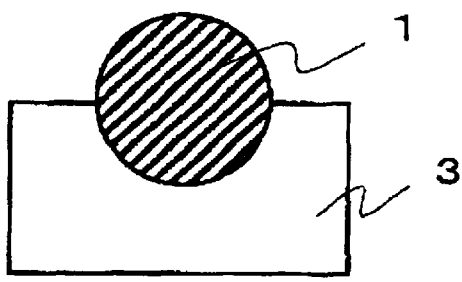
Figure 2:
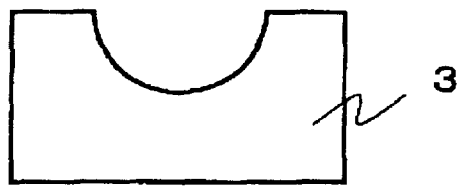
Figure 3:
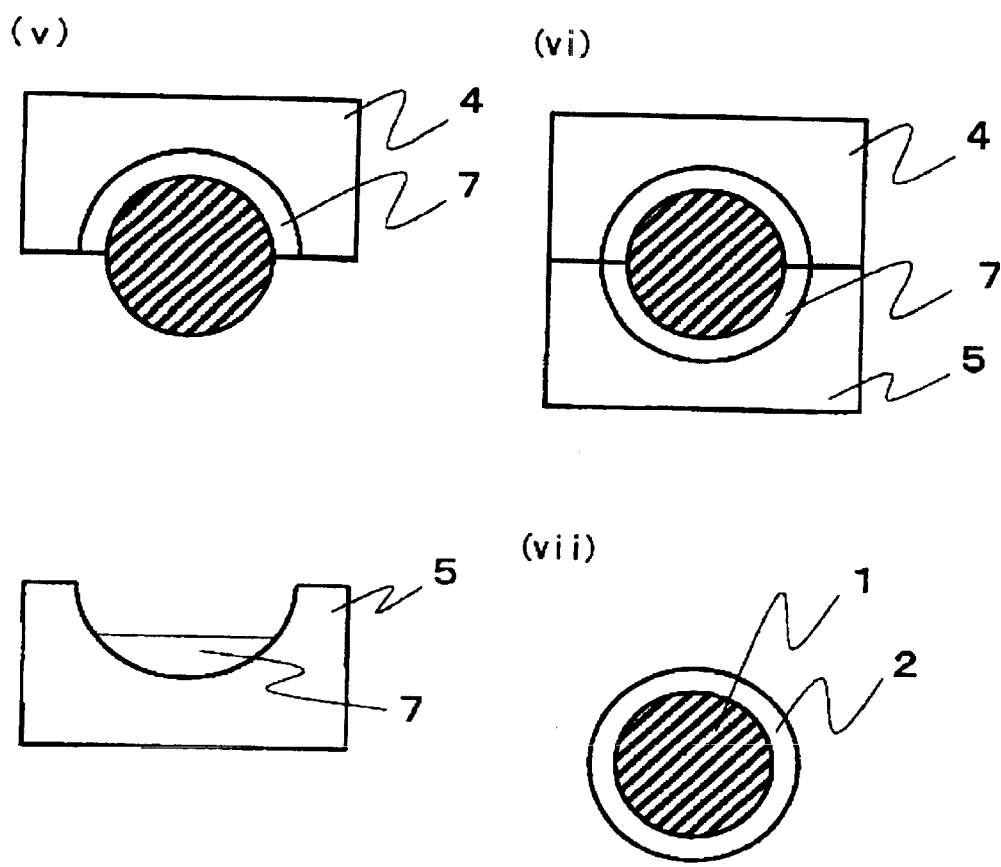
FIG. 3 is a schematic illustrating one embodiment of a method of making the golf ball of the present invention.

The step (b) will be explained with reference to the accompanying drawings. FIG. 2 and FIG. 3 are schematics illustrating a method of covering the cover 2 on the core 1. As shown in FIG. 2, (i) Polyurethane composition for the cover is put into a preheated first half mold 4 having a semi-spherical cavity, followed by allowing said polyurethane composition to be made to a given gel state, wherein the cavity has such a diameter as provides the resulting golf ball having a desired diameter, and many projections are provided in the cavity to form dimples on a surface of the golf ball. In case of using thread wound core, the preheating temperature, that is, curing temperature of the polyurethane composition for the cover is within the range of 70 to 100° C., preferably 70 to 90° C. When the temperature is lower than 70° C., the polyurethane composition for the cover is not cured or the cure reaction is not stable, and the curing time is very long even if the composition is further cured. On the other hand, when the temperature is higher than 100° C., the polyurethane composition for the cover, and the core are deteriorated by heat. In case of using solid core, the curing temperature is within the range of 70 to 140° C., preferably 80 to 120° C. When the temperature is lower than 70° C., the polyurethane composition for the cover is not cured or the cure reaction is not stable, and the curing time is very long even if the composition is further cured. On the other hand, when the temperature is higher than 140° C., the polyurethane composition for the cover is deteriorated by heat.

The term "a given gel state" as used herein refers to such state that the polyurethane composition is not dropped when turning the half mold upside down and it is possible to mold the uniform cover because the composition still has flowability after clamping the half molds. Concretely, it is such state that the polyurethane composition has a viscosity of 30,000 to 60,000 cps at 70 to 80° C. which is measured with a Brookfield type viscometer. In case of using the thread wound core, there was problem of unraveling the wound of the thread rubber in a stretched state when the polyurethane composition for the cover having low viscosity is contacted with the thread wound core. In the present invention, the problem was solved by allowing the polyurethane composition to be made to a given gel state described above.

The core 1 is placed on a core half mold 3 having a semi-spherical cavity with a diameter enough for holding the core therein, and the first half mold 4 is turned upside down so as to position it above the core half mold 3. In the method of the present invention, it is not required to hold the core in the core half mold 3 using a sucking mean by reduced pressure, because the mold is positioned below the first half mold 4. When thread wound core was used in the conventional method described above, it was required to coating the core with latex, because it has many interstices and can be not held by the sucking mean. Therefore there was problem to degrade rebound characteristics and spin amount in the conventional method, because the latex layer was a cushion layer between the core and cover and it is difficult to penetrate the cover into the core by the presence of the latex layer. In the method of the present invention, the above problem can not be caused.

Moreover, in the thread wound core comprising a center and thread rubber layer uneven unlike the solid core, since the surface is not smooth and the density of winding of the thread rubber is uneven, stress is applied on the core by strongly sucking it, and there was problem that the eccentricity of the center in the core easily occurred. In the method of the present invention, since the thread wound core was mounted in the semi-spherical cavity of the core half mold 3 positioned below the first half mold, stress is not applied on the core, and the above problem can not be caused. In the method of the present invention, the thread wound core is held by the semi-spherical cavity having the same diameter as that of the core, the eccentricity of the core does not occur, and the thickness of the cover covered on the core is uniform.

(iii) The first half mold 4 is taken down, and the first half mold 4 and the core half mold 3 are clamped to press mold with heating. It is desired to slowly take down the first half mold 4 in order to avoid of leaving air between the core 1 and polyurethane cover 2. The descending rate of the first half mold 4 when clamping is 3 to 10 mm/min, preferably 5 to 8 mm/min. The press time is 0.5 to 3 minutes, preferably 1 to 2 minutes. When the press time is shorter than 0.5 minutes, the curing of the cover composition is not sufficiently conducted, the core is not adhered to the polyurethane cover. On the other hand, when the press time is longer than 3 minutes, in case of using a thread wound core, heat deterioration of thread rubber of the core occurs even if molding at the temperature lower than the preset temperature, and the rebound characteristics are degraded. The time until clamping the first half mold 4 and the core half mold 3 from the cover composition of polyurethane being in a given gel state is within the range of 0.5 to 3 minutes, preferably 1 to 2 minutes. When the time is shorter than 0.5 minutes, the descending rate of the first half mold 4 is high, which leaves air between the core 1 and polyurethane cover 2. On the other hand, when the time is longer than 3 minutes, the curing of the polyurethane composition is excessively conducted, and the flowability is degraded. Therefore it is difficult to mold the cover.

(iv) The first half mold 4 is opened by raising it to form an intermediate molded article of golf ball, of which a half of the surface of the core 1 is covered with the polyurethane cover.

(v) In the same manner as the step (i), polyurethane composition for the cover 7 is put into a preheated second half mold 5, followed by allowing said polyurethane composition to be made to a given gel state. The second half mold 5 is then positioned below the first half mold 4 with keeping the intermediate molded article obtained in the step (iv) in the first half mold 4.

(vi) The first half mold 4 is taken down, and the half mold 4 and the second half mold 5 are clamped to press mold with heating. The descending rate of the first half mold 4 is the same as described in the step (iii). The press time is 5 to 30 minutes, preferably 10 to 20 minutes. When the press time is shorter than 5 minutes, the curing of the cover composition is not sufficiently conducted, and it is impossible to remove the molded article from the mold. On the other hand, when the press time is longer than 30 minutes, in case of using a thread wound core, heat deterioration of thread rubber of the core occurs even if molding at the temperature lower than the preset temperature, and the rebound characteristics are degraded.

(vii) The first half mold 4 is opened by raising it after cooling to room temperature to cover the other half of the surface of the core with the cover composition of polyurethane cover.

It is desired for the cover 2 to have a thickness of 0.5 to 2.0 mm, preferably 1.0 to 1.6 mm. When the thickness of the cover is smaller than 0.5 mm, the technical effect accomplished by the presence of the cover is not sufficiently obtained. On the other hand, when the thickness is larger than 2.0 mm, the shot feel is poor.

It is desired for the cover 2 to have a hardness in hardness of 40 to 65, preferably 50 to 60. When the hardness is lower than 40, the cover is too soft, and the rebound characteristics are degraded, or the shot feel is heavy and poor. On the other hand, when the hardness is larger than 65, the shot feel is hard and poor. The cover hardness as used herein refers to the hardness measured at the surface of the golf ball, which is obtained by covering the cover on the core.

Furthermore, paint finishing or marking with a stamp may be optionally provided after the cover is molded for commercial purposes. The golf ball of the present invention is formed to a diameter of at least 42.67 mm (preferably 42.67 to 42.82 mm) and a weight of no more than 45.92 g, in accordance with the regulations for golf balls.

EXAMPLES

The following Examples and Comparative Examples further illustrate the present invention in detail but are not to be construed to limit the scope of the present invention.

(a) Production of core (1) Thread wound core

The rubber composition having the formulation "a" shown in Table 1 was mixed, and the mixture was then vulcanized by press-molding at 160° C. for 15 minutes in a mold, which is composed of an upper mold and a lower mold having a semi-spherical cavity to obtain a center having a diameter of 31.5 mm. Each thread wound core was obtained by winding a thread rubber around the resulting center. The thread rubber was prepared from a blend of natural rubber and a low cis-isoprene rubber ("Shell IR-309" commercially available from Shell Chemical Co., Ltd.)=50/50 (weight ratio) as a base rubber. The diameter of the thread wound core was 40.0 mm.

(2) Solid core

The rubber composition having the formulation "b" shown in Table 1 was mixed, and the mixture was then vulcanized by press-molding at 170° C. for 15 minutes in a mold, which is composed of an upper mold and a lower mold having a semi-spherical cavity to obtain a solid core having a diameter of 40.0 mm.

TABLE 1

| Rubber composition | (parts by weight) | |
|---|---|---|
| | a | b |
| BR11 *1 | 100 | — |
| BR18 *2 | — | 100 |
| Zinc oxide | 5 | 10.5 |
| Stearic acid | 2 | — |
| Zinc acrylate | — | 32 |
| Sulfur | 10 | — |
| Nocceler CZ *3 | 1.5 | — |
| Nocceler TT *4 | 0.2 | — |
| Dicumyl peroxide | — | 1.0 |
| Diphenyl disulfide | — | 0.5 |
| Barium sulfate | 75 | — |

*1: High-cis polybutadiene, commercially available from JSR Co., Ltd. under the trade name "BR11", Content of 1,4-cis-polybutadiene: 96%
*2: High-cis polybutadiene, commercially available from JSR Co., Ltd. under the trade name "BR18", Content of 1,4-cis-polybutadiene: 96%
*3: Vulcanization accelerator (trade name "Nocceler CZ") N-cyclohexyl-2-benzothiazyl sulfenamide from Ouchi Shinko Chemical Industries Co., Ltd.
*4: Vulcanization accelerator (trade name "Nocceler TT") tetramethyl thiuram disulfide from Ouchi Shinko Chemical Industries Co., Ltd.

Examples 1 to 3 (Covering of polyurethane cover)

Example 1

(i) The cover composition A of polyurethane having the formulation shown in Table 2 of 6 g was put into a cavity of the first half mold 4 preheated at 70° C. using a nozzle 6 of casting machine having a mean of reducing pressure.

(ii) After 6 minutes, when the cover composition was in a given gel state, the first half mold 4 was turned down, and positioned above the core half mold 3.

(iii) The first half mold 4 was slowly taken down, and the first half mold and the core half mold were clamped to press mold with heating for 1 minute.

(iv) The first half mold 4 was opened by raising it to form an intermediate molded article of golf ball, of which a half of the surface of the thread wound core was covered with the cover composition of polyurethane.

(v) In the same manner as the step (i), 6 g of the cover composition A of polyurethane was put into a cavity of the second half mold 5 preheated at 70° C. After 6 minutes, when the cover composition was in a given gel state, the second half mold 5 was positioned below the first half mold 4 with keeping the intermediate molded article in the first half mold.

(vi) The first half mold 4 was slowly taken down, the first half mold 4 and the second half mold 5 were clamped to press mold with heating for 10 minutes.

(vii) After cooling to room temperature, the molds were opened to take out a molded article. A paint was coated on the surface of the molded article to obtain a thread wound golf ball having a diameter of 42.8 mm.

Example 2

A thread wound golf ball was obtained as described in Example 1, except that the cover composition B of polyurethane having the formulation shown in Table 2 was used. The time until a given gel state is obtained in the steps (ii) and (v) reduced from 6 minutes to 1 minute, because of the effect of the catalyst used in the formulation B of the polyurethane composition for the cover.

Example 3

A solid golf ball was obtained as described in Example 1, except that the solid core was used. However, the mold temperature was 100° C., because it is not required to consider heat deterioration of the thread rubber unlike the case of using the tread wound core. As a result, the time until a given gel state is obtained in the steps (ii) and (v) reduced from 6 minutes to 3 minutes.

Comparative Example 1

The cover composition C of ionomer resin having the formulation shown in Table 2 was covered on the thread wound core obtained as described in Examples 1 and 2 by directly injection molding to form a cover layer. Then, paint was coated on the surface of the cover layer to obtain a thread wound golf ball having a diameter of 42.8 mm.

With respect to the resulting golf balls, the cover hardness (Shore D hardness), initial velocity, flight distance and chunking (scuff) resistance were measured or evaluated. The results are shown in Table 3. The test methods are described later.

TABLE 2

| Cover composition | (parts by weight) | | |
|---|---|---|---|
| | A | B | C |
| Adiprene LF930A *5 | 100 | 100 | — |
| Ronzacure M-CDEA *6 | 21.4 | 21.4 | — |
| Tertiary amine-based catalyst *7 | — | 0.1 | — |
| Titanium dioxide | 1.0 | 1.0 | — |
| Hi-milan 1555 *8 | — | — | 15 |
| Hi-milan 1855 *9 | — | — | 50 |
| Surlyn 6320 *10 | — | — | 35 |

*5: TDI (content of NCO = 5.0%)-PTMG-based prepolymer, commercially available from Uniroyal Chemical Co.; Content of free TDI = not more than 0.1%
*6: 2,2'-dichloro-3,3',5,5'-tetraethyl-4,4'-diaminodiphenylmethane (curing agent); Amine value = 297 mg KOH/g
*7: DABCO 33-LV (trade name), commercially available from Air Products and Chemicals, Inc.
*8: Hi-milan 1555 (trade name), ethylene-methacrylic acid-alkyl acrylate terpolymer ionomer resin obtained by neutralizing with sodium ion, manufactured by Du Pont-Mitsui Polychemicals Co., Ltd.
*9: Hi-milan 1855 (trade name), ethylene-methacrylic acid-alkyl acrylate terpolymer ionomer resin obtained by neutralizing with zinc ion, manufactured by Du Pont-Mitsui Polychemicals Co., Ltd.
*10: Surlyn 6320 (trade name), ethylene-methacrylic acid-acrylic acid ester terpolymer ionomer resin obtained by neutralizing with magnesium ion, manufactured by Du Pont Co.

Test methods (1) Cover hardness

After the golf ball is obtained by covering the core with the cover, the cover hardness is determined by measuring Shore D hardness at the surface of the golf ball. Shore D hardness is measured with a Shore D hardness meter according to ASTM-D 2240-68 at 23° C.

(2) Flight performance

A No.1 wood club (a driver, W#1) having meal head was mounted to a swing robot manufactured by Golf Laboratory Co. and the resulting golf ball was hit at a head speed of 50 m/second, the initial velocity and flight distance were measured. As the flight distance, total that is a distance to the stop point of the hit golf ball was measured. The measurement was conducted 12 times for each golf ball (n=12), and the average is shown as the result of the golf ball. The initial velocity is indicated by an index when that of Example 1 is 100.

(3) Chunking (scuff) resistance

After a pitching wedge commercially available was mounted to a swing robot manufactured by Golf Laboratory Co., two points on the surface of each golf ball was hit at a head speed of 36 m/sec one time for each point. The two points were evaluated by checking the surface appearance by visual observation. The evaluation criteria are as follows.

Evaluation criteria o: The surface of the golf ball slightly has a cut, but it is not particularly noticeable.

Δ: The surface of the golf ball clearly has a cut, and the surface becomes fluffy.

x: The surface of the golf ball is considerably chipped off, and the surface noticeably becomes fluffy.

TABLE 3

| Test item | Example No. | | | Comparative Example No. |
| --- | --- | --- | --- | --- |
| | 1 | 2 | 3 | 1 |
| Core | (1) | (1) | (2) | (1) |
| Cover | A | B | A | C |
| Cover hardness (Shore D) | 49 | 49 | 49 | 52 |
| (Physical properties of golf ball) | | | | |
| Initial velocity | 100 | 101 | 102 | 98 |
| Flight distance (m) | 275 | 276 | 278 | 272 |
| Chunking resistance | o | o | o | x |

What is claimed is:

1. A method of making a golf ball comprising a core and polyurethane cover covering the core, the method comprising the steps of:

(a) forming a spherical core, and (b) (i) putting polyurethane composition for the cover into a preheated first half mold having a semi-spherical cavity, followed by allowing said polyurethane composition to be made to a given gel state, wherein the cavity has such a diameter as provides the golf ball having a desired diameter, and many projections are provided in the cavity to form dimples on a surface of the golf ball, (ii) placing the core on a core half mold having a semi-spherical cavity with a diameter enough for holding the core therein, and turning the first half mold upside down so as to position it above the core half mold, (iii) taking down the first half mold, and clamping the first half mold and the core half mold to press mold with heating, (iv) opening the mold by raising the first half mold to form an intermediate molded article of golf ball, wherein a half of the surface of the core is covered with the polyurethane cover, (v) putting polyurethane composition for the cover into a preheated second half mold having a semi-spherical cavity and allowing the polyurethane composition to be made to a given gel state in the same manner as the step (i), followed by positioning the second half mold below the first half mold with keeping the intermediate molded article in the first half mold, (vi) taking down the first half mold, clamping the first half mold and the second half mold and press molding with heating to cover the other half of the surface of the core with the polyurethane cover, and (vii) after cooling, opening the mold by raising the first half mold to take out a molded article.

2. The method according to claim 1, wherein the core is thread wound core.

3. The method according to claim 1, wherein the polyurethane cover is formed from polyurethane composition for the cover comprising urethane prepolymer having terminal isocyanate group and curing agent.

4. The method according to claim 1, wherein the curing agent is 2,2'-dichloro-3,3',5,5'-tetraethyl-4,4'-diaminodiphenylmethane.

5. The method according to claim 1, wherein the cover has a thickness of 0.5 to 2.0 mm.

* * * * *